Oct. 29, 1935.   L. W. BLAU   2,018,700
WELL PUMPING DEVICE
Filed April 17, 1934   2 Sheets-Sheet 1
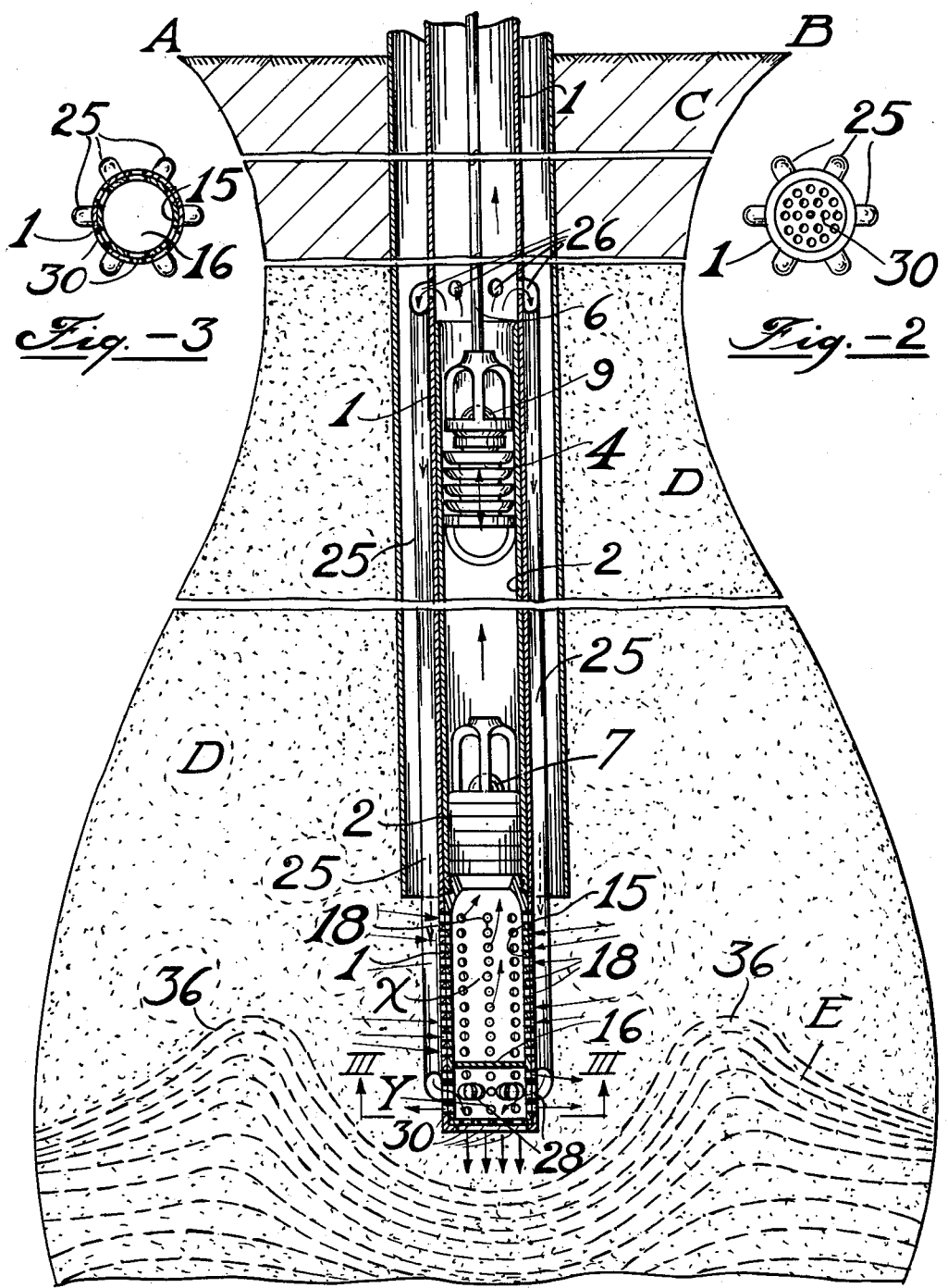

Patented Oct. 29, 1935

2,018,700

UNITED STATES PATENT OFFICE 2,018,700

WELL PUMPING DEVICE

Ludwig W. Blau, Houston, Tex., assignor to Standard Oil Development Company, a corporation of Delaware Application April 17, 1934, Serial No. 720,925

8 Claims. (Cl. 103—204)

This invention relates to improvements in the pumping of oil. In pumping oil, the presence of salt water in the oil bearing sand often results in the formation of a so-called salt water cone adjacent the pump inlet. This cone is due to the pressure gradient produced by the pump. The salt water cone remains even after the pumping ceases on account of the surface tension of the salt water. After the salt water cone has been formed, salt water is produced along with the oil. The ratio of salt water to the oil produced increases with time. Many wells produce ten times as much salt water as oil and some even approximately a hundred times as much salt water as oil. In the later stages so much salt water is produced that even though oil is still present in the oil bearing sand above the salt water, it becomes necessary to abandon the well because production is no longer profitable. Such abandonment results in decreased profits for the producing organization and results in waste of the oil left in the sand. The production of salt water is very undesirable also because the salt water brought to the surface must be disposed of and this disposal is often very expensive.

It is an object of this invention to cheaply, conveniently and practically prevent the production of salt water from pumping or flowing wells. Other objects will be apparent from the specification and from the accompanying drawings in which latter—

Fig. 1 is a diagrammatic view of an oil well showing an improved pumping apparatus in longitudinal sectional view;

Fig. 2 is a bottom plan view of the pumping apparatus of Fig. 1;

Fig. 3 is a transverse sectional view taken along the line III—III of Fig. 1;

Figures 4, 5:
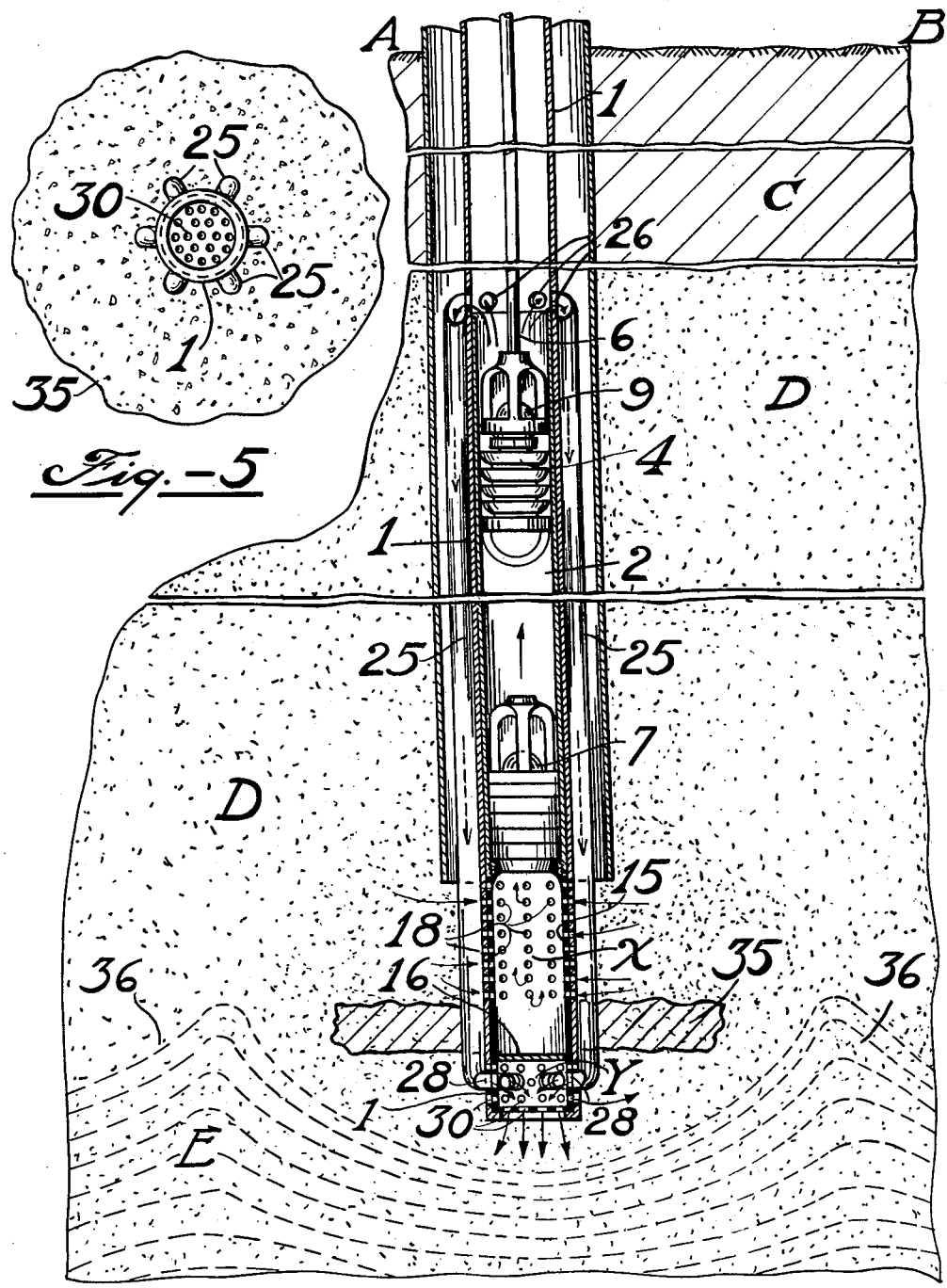
Fig. 4 is a longitudinal sectional view of a modified form of pumping apparatus.
Fig. 5 is a bottom plan view of the modified form of pumping apparatus.

Referring particularly to Figs. 1, 2 and 3 of the drawings, reference letters A, B, designate the surface of the ground. The letter C designates sediments or rocks overlying the oil bearing sand D, the bottom of which is saturated with salt water E. An oil well extends from the surface A, B, into the oil bearing sand D and is provided with tubing 1. The bottom of the tubing 1 carries a pump cylinder or working barrel 2. A plunger 4 for the barrel 2 is attached to a pump rod 6. A check valve 7 is provided at the bottom of the barrel 2 and a traveling discharge check valve 9 is attached to the plunger 4. The pump operates as follows: On the downward stroke of the plunger 4, the valve 7 closes while the valve 9 is opened. When the plunger 4 has reached its lowest position, the valve 9 closes and as the plunger 4 starts on its upward stroke, the valve 7 opens admitting oil to the barrel 2. While the plunger 4 is rising and the valve 7 is open, a very low pressure exists at the valve 7. This low pressure and the resultant pressure gradient has been responsible for the gradual formation of a salt water cone below the barrel 2 which accounts for the increasing ratio of salt water to oil produced.

The prevention of the salt water cone is effected by the following arrangement of parts: A tube or pipe 15 depends from the barrel 2 on the inlet side of the barrel and rests on the bottom of pipe 1. A partition 16 extends transversely of the tube 15 between the ends of the tube dividing the tube into compartments X and Y. The tube 15 is provided with a plurality of openings 18 in the side walls of the compartment X between the partition 16 and the barrel 2, constituting inlet openings through which oil is drawn into the pump inlet. The tubing 1 constitutes a discharge line which leads from the barrel 2 whereby a head of oil is maintained in the discharge line.

Return conduit means lead from the discharge line to the compartment Y beneath the partition 16. The return conduit means comprise a plurality of tubes 25 which lead from the discharge line 1 through inlet openings 26 above the barrel 2 and which deliver the by-passed oil through openings 28 into the compartment Y. The compartment Y is provided with a plurality of openings 30 in its side and bottom walls. The compartment Y thereby serves as an outlet whereby a portion of the oil from the line 1 is delivered under the head of pressure in the line into the sand beneath the compartment Y whereby water in the sand below the compartment Y is forced away from the outlet.

The tubes 25 are fastened to tube 1 on the outside of the working barrel 2 and on tube 15 in such a manner that oil in the tubing 1 can run into the tubes 25 from a point above the working barrel 2 and down these tubes to the compartment Y. The size and number of the tubes 25 is determined by the amount of oil which it is desired to return to the compartment Y from the tubing 1. The compartment Y becomes a source of oil at high pressure. A salt water cone can no longer be formed around the inlet valve 7 of the pump.

Referring to Figs. 4 and 5, a modified form of the invention is shown in which a wall 35 projects radially outwardly from the tube 15 adjacent the partition 16 and between the inlet openings 18 of the compartment X and the outlet openings 30 of the compartment Y. Otherwise the construction of the pumping apparatus is identical with the structure disclosed in Figs. 1, 2 and 3, and like reference numerals have been applied to like parts. The presence of the wall 35 acts as a barrier to the flow of salt water to the check valve 7. In the preferred method of forming the wall 35 concrete is poured into the tubing 1 after the working barrel 2, the pump rod 6, plunger 4, check valves 7 and 9, and bottom tube 15 have been removed. The concrete is forced radially outwardly below the tubing 1. The concrete then forms a more or less symmetrical wall 35. The oil delivered by the compartment Y is now forced farther away from the pump inlet with the result that the salt water E is also removed to a greater distance from the working barrel and from the check valve 7. The extreme position of the salt water in its built up position around the pumping apparatus under the influence of the oil discharged from the compartment Y is indicated at 36 upon the drawings.

Various changes may be made within the scope of the appended claims in which it is desired to claim all novelty inherent in the invention as broadly as the prior art permits.

I claim:

1. Apparatus for pumping oil from superposed layers of oil and water in a well, comprising a working barrel of a pump adapted to be disposed adjacent the bottom of the well, a pipe depending from the pump inlet having a closed bottom end and having lateral inlet openings through which oil is drawn into the barrel, an outlet beneath the closed bottom end, a discharge line leading upwardly from the barrel whereby a head of liquid is maintained in the line, and return conduit means leading from the discharge line to the outlet to deliver a portion of the oil from the line through the outlet under the head of pressure in the line whereby water in the earth below the outlet is forced away from the outlet.

2. Apparatus for pumping oil from superposed layers of oil and water in a well according to claim 1, in which the outlet is a perforated chamber.

3. Apparatus for pumping oil from superposed layers of oil and water in a well according to claim 1, in which a wall protrudes radially outwardly form the pipe beneath the lateral inlet openings.

4. Apparatus for pumping oil from superposed layers of oil and water in a well according to claim 1, in which the return conduit means is a plurality of conduits disposed around the pipe.

5. Apparatus for pumping oil from superposed layers of oil and water in a well, comprising a working barrel of a pump adapted to be disposed adjacent the bottom of the well, a tube depending from the pump inlet and having openings in its side and bottom walls, a partition extending transversely between the ends of the tube; the lateral openings between the partition and the barrel constituting inlet openings through which oil is drawn into the pump inlet, a discharge line leading upwardly from the barrel whereby a head of oil is maintained in the line, and return conduit means leading from the discharge line to the tube beneath the partition, the openings below the partition being discharge openings to deliver a portion of the oil from the line under the head of pressure in the line whereby water in the earth below the barrel is forced away from the barrel.

6. Apparatus for pumping oil from superposed layers of oil and water in a well according to claim 5, in which a wall protrudes radially outwardly from the tube between the inlet openings and the discharge openings.

7. Apparatus for pumping oil from superposed layers of oil and water in a well according to claim 5, in which the return conduit means is a plurality of conduits disposed around the tube.

8. The method of pumping oil from superposed layers of oil and water in a well, which comprises pumping oil upwardly in a confined stream from an inlet in the oil layer and returning a portion of the oil from the stream to the area immediately below the inlet of the stream whereby the pressure of the returning oil prevents coning of the water.

LUDWIG W. BLAU.